(12) United States Patent
Williams et al.

(10) Patent No.: US 10,429,147 B2
(45) Date of Patent: Oct. 1, 2019

(54) PORTABLE SHOOTING STABILIZATION ASSIST CLAMP

(71) Applicant: Wicked Aim, LLC, Fort Worth, TX (US)

(72) Inventors: Cody Williams, Rockport, TX (US); Dan Dipprey, Fort Worth, TX (US)

(73) Assignee: Wicked Aim, LLC, Fort Worth, TX (US)

( * ) Notice: Subject to any disclaimer, the term of this patent is extended or adjusted under 35 U.S.C. 154(b) by 0 days.

(21) Appl. No.: 15/177,026

(22) Filed: Jun. 8, 2016

(65) Prior Publication Data

US 2017/0356713 A1    Dec. 14, 2017

Related U.S. Application Data

(63) Continuation-in-part of application No. 14/820,512, filed on Aug. 6, 2015, now abandoned.

(60) Provisional application No. 62/033,957, filed on Aug. 6, 2014.

(51) Int. Cl.
| | |
|---|---|
| *F41A 23/02* | (2006.01) |
| *F16M 13/02* | (2006.01) |
| *F16B 2/10* | (2006.01) |
| *F16B 2/00* | (2006.01) |
| *F41A 23/06* | (2006.01) |

(52) U.S. Cl.
CPC .............. *F41A 23/02* (2013.01); *F16B 2/005* (2013.01); *F16B 2/10* (2013.01); *F16M 13/022* (2013.01); *F41A 23/06* (2013.01)

(58) Field of Classification Search
CPC .......... F41A 23/02; F41A 23/04; F41A 23/08; F41A 23/10; F41A 23/12; F41A 23/14; F41A 23/16; F16M 13/022; F16B 2/005; F16B 2/10
USPC ............................................................ 42/94
See application file for complete search history.

(56) References Cited

U.S. PATENT DOCUMENTS

| | | | | |
|---|---|---|---|---|
| 2,220,234 A | * | 11/1940 | Hadaway | A01K 97/10 248/316.5 |
| 2,484,427 A | * | 10/1949 | Schwenk | A01K 97/10 248/515 |
| 2,510,181 A | * | 6/1950 | Jury | F21L 14/00 24/521 |
| 2,693,660 A | * | 11/1954 | Nebergall | A01K 97/10 248/514 |

(Continued)

*Primary Examiner* — Patrick D Hawn
(74) *Attorney, Agent, or Firm* — Gehrke & Associates, SC; Lisa M. Gehrke

(57) ABSTRACT

A portable, quick-release shooting stabilization assist clamp designed for quick and easy, single-handed attachment and detachment on to a shooting rail or similar solid object. Once attached to an object, the clamp supports a firearm forestock, forend, frame, stock, or barrel allowing the user a steadier aim for more accurate shot placement. The clamp provides the capacity of a rapid attachment and detachment by using a spring clamp design. In its preferred embodiment, the clamp provides a rest with two angled prongs, above the pivot of the spring clamp, to help to easily place and retain the gun on the clamp. In alternative embodiments, multiple rests are provided as well as movable, pivoting rests. In addition to assisting shooters and hunters, the clamp could also be used to stabilize a camera, telescope, small video camera, or other device that is enhanced by stabilization.

11 Claims, 12 Drawing Sheets

(56) References Cited

U.S. PATENT DOCUMENTS

| | | | | |
|---|---|---|---|---|
| 2,798,684 | A * | 7/1957 | Walden | A01K 97/10 248/173 |
| 2,961,209 | A * | 11/1960 | Willey | A01K 97/10 248/515 |
| 2,988,311 | A * | 6/1961 | Bow | A01K 97/10 248/122.1 |
| 3,140,069 | A * | 7/1964 | McBurney | A01K 97/10 248/201 |
| 3,235,998 | A * | 2/1966 | Hadley | F41A 23/08 42/94 |
| 3,302,910 | A * | 2/1967 | Williams | F41A 23/08 248/126 |
| 3,338,540 | A * | 8/1967 | Barish | A47K 5/05 248/212 |
| 3,576,084 | A * | 4/1971 | Anderson, Jr. | F41A 23/04 42/94 |
| 4,397,112 | A * | 8/1983 | York | F41A 23/08 42/94 |
| 4,409,751 | A * | 10/1983 | Goda | F41A 23/00 42/94 |
| 4,733,842 | A * | 3/1988 | Wilkerson | F16B 2/10 24/495 |
| 4,830,322 | A * | 5/1989 | Gary | A47G 1/21 211/45 |
| 4,998,944 | A * | 3/1991 | Lund | F41A 23/18 211/64 |
| 5,067,683 | A * | 11/1991 | Wager | F41J 1/10 248/156 |
| 5,332,185 | A * | 7/1994 | Walker, III | F41A 23/02 248/346.2 |
| 5,421,115 | A * | 6/1995 | McKay | F41A 23/12 248/163.1 |
| 5,481,817 | A * | 1/1996 | Parker | F41A 23/02 248/286.1 |
| 5,697,181 | A * | 12/1997 | Savant | B62J 11/00 211/64 |
| 5,975,479 | A * | 11/1999 | Suter | A01K 97/10 248/534 |
| 6,357,710 | B1 * | 3/2002 | Fielden | A45B 11/00 248/231.51 |
| 6,421,948 | B1 * | 7/2002 | Craig | A01K 97/01 248/231.51 |
| 6,487,813 | B2 * | 12/2002 | Baynard | A01K 97/10 248/538 |
| 7,178,777 | B1 * | 2/2007 | Banker | B25B 5/101 24/569 |
| 7,197,844 | B2 * | 4/2007 | Benson | F41A 23/08 248/593 |
| 7,290,690 | B2 * | 11/2007 | Hancock | B63B 25/002 114/343 |
| 8,091,845 | B2 * | 1/2012 | Di Lollo | A47J 47/16 211/41.1 |
| 8,356,784 | B2 * | 1/2013 | Doll | F16M 13/022 248/229.13 |
| 9,185,902 | B1 * | 11/2015 | Mazzei, Sr. | F16M 11/14 |
| 9,625,229 | B1 * | 4/2017 | Hilz | F41A 23/02 |
| 9,763,435 | B2 * | 9/2017 | Schultz | A01K 97/10 |
| 2004/0020097 | A1 * | 2/2004 | Deros | F41A 23/02 42/94 |
| 2005/0005500 | A1 * | 1/2005 | Howley | A01K 97/10 43/21.2 |
| 2005/0188597 | A1 * | 9/2005 | Keng | F41A 23/08 42/94 |
| 2006/0196101 | A1 * | 9/2006 | Mrotek | A01K 97/01 43/21.2 |
| 2006/0201898 | A1 * | 9/2006 | Hughes | B60R 7/14 211/64 |
| 2009/0026679 | A1 * | 1/2009 | Harman, III | F41A 23/16 269/43 |
| 2009/0188146 | A1 * | 7/2009 | Werner | F41A 23/16 42/94 |
| 2009/0205238 | A1 * | 8/2009 | Willis, Jr. | F41A 27/28 42/94 |
| 2010/0154277 | A1 * | 6/2010 | Lee | F41A 23/16 42/94 |
| 2011/0167705 | A1 * | 7/2011 | Cauley | F41A 23/14 42/94 |
| 2011/0308131 | A1 * | 12/2011 | McLinda | A01K 97/10 42/94 |
| 2012/0017485 | A1 * | 1/2012 | Kern | F41A 23/16 42/94 |
| 2012/0186125 | A1 * | 7/2012 | Werner | F41A 23/18 42/94 |
| 2012/0227305 | A1 * | 9/2012 | Fontenot | F41A 23/02 42/94 |
| 2013/0086835 | A1 * | 4/2013 | Minneman | F41A 23/16 42/94 |
| 2014/0261595 | A1 * | 9/2014 | Mausen | A01M 31/025 135/90 |
| 2014/0284443 | A1 * | 9/2014 | Forbes | G09F 21/04 248/313 |
| 2017/0356714 | A1 * | 12/2017 | Linderwell | F41A 23/06 |

* cited by examiner

PORTABLE SHOOTING STABILIZATION ASSIST CLAMP

CROSS REFERENCE TO RELATED APPLICATION

This application is a Continuation in part of application U.S. Ser. No. 14/820,512, filed on Aug. 6, 2015, which claims priority to provisional application 62/033,957 filed on Aug. 6, 2014. These applications are herein incorporated by reference.

BACKGROUND

A gun rest is a device that stabilizes a firearm when in use and allows a shooter to increase the connection of a firearm to the ground. By placing a firearm on a steady rest, a shooter can better control the firearm and thereby improve shot placement accuracy. In the context of hunting, portability and the ease and speed of re-positioning of a gun rest are very important. Opportunities to harvest wild-game do not present themselves in reliable or predictable directions; therefore, being able to quickly move or place a gun rest in various positions is desirable.

SUMMARY

The present application discloses a gun rest clamp that comprises a portable, quick-release stabilization assist clamp that may be quickly removed from one surface and secured on a new surface without sacrificing the stability provided by a gun rest attached to a fixed location. In a hunting context, the portable, quick-release stabilization assist clamp may be secured to almost any fixed firm surface, such as a fence or branch, but works particularly well when clamped on a deer stand which provides railings. Previously available gun rests, required the rest to be securely fastened to a railing using some sort of screw based method. As a result, the gun rest could not be moved quickly for use in a different position or direction. The presently disclosed portable shooting stabilization assist clamp can be quickly removed and quietly re-positioned on another surface when needed. No tools are required to operate the device. The hunter simply squeezes the clamp into an open position, places it in the desired location and releases the pressure on the clamp. This can normally be accomplished with one hand. This one-handed operation allows the user to attached the rest with one hand while holding a firearm in the other hand. As a result, the user does not need to put down the firearm or take valuable time to secure the device, as would be required when using a previously available rest design.

The preferred manufacturing method utilizes primarily injection-molded plastic. As a result, the clamp is quieter and lighter than metal and impervious to weather related corrosion.

DETAILED DESCRIPTION

Figure 1:
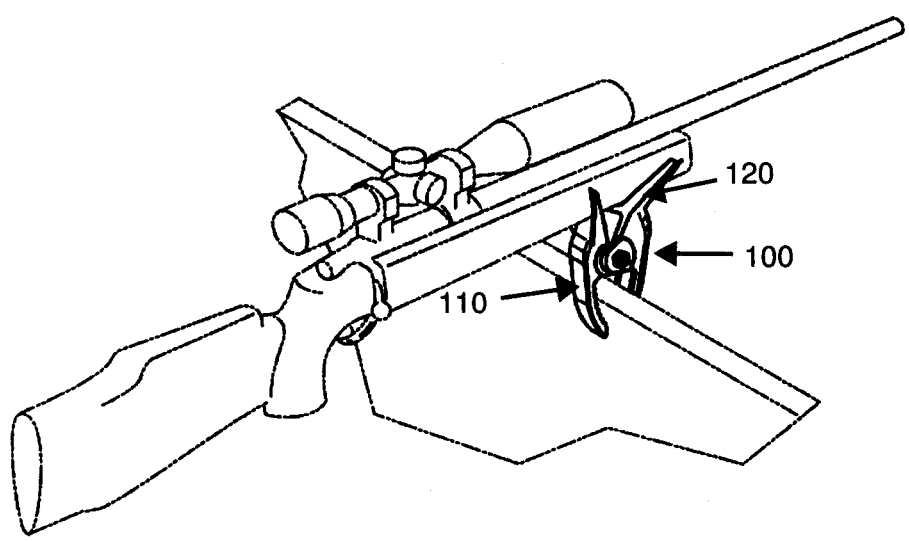
FIG. 1 shows a portable, quick-release shooting stabilization assist clamp while in use. The clamp is attached to a railing and supports a firearm fore-stock, forend, frame, stock, or barrel.

Referring now to FIG. 1, the present disclosure is directed to a portable, quick-release shooting stabilization clamp (100) comprising a clamping end (110) used to secure the clamp (100) to a fixed surface, and a rest end (120) having extensions that form a cradle to receive a firearm fore-stock, forend, frame, stock, or barrel when in use. In response to the approach of a game animal or in anticipation of its predicted approach, the hunter finds a railing or another appropriate stable object, squeezes the rest end to open the jaws of the portable, quick-release shooting stabilization assist clamp and then releases the jaws over the stabilizing object to secure the clamp (100). This can normally be accomplished with one hand, which allows a gun held in the other hand to be quickly placed on the rest after the clamp (100) is secured to a fixed surface. In addition, the hunter can easily remove the gun from the clamp by simply lifting the gun upward. Nothing aside from the gun's mass holds it in the cradle of the rest end (120), so the gun may be easily lifted off the rest of clamp (100) if desired. Once the hunter is finished using the clamp (100), it can be easily removed by squeezing the extensions of rest end (120) toward each other to open the jaws of the clamping end (110) and moving the clamp (100) away from the stabilizing object.

Figure 2:
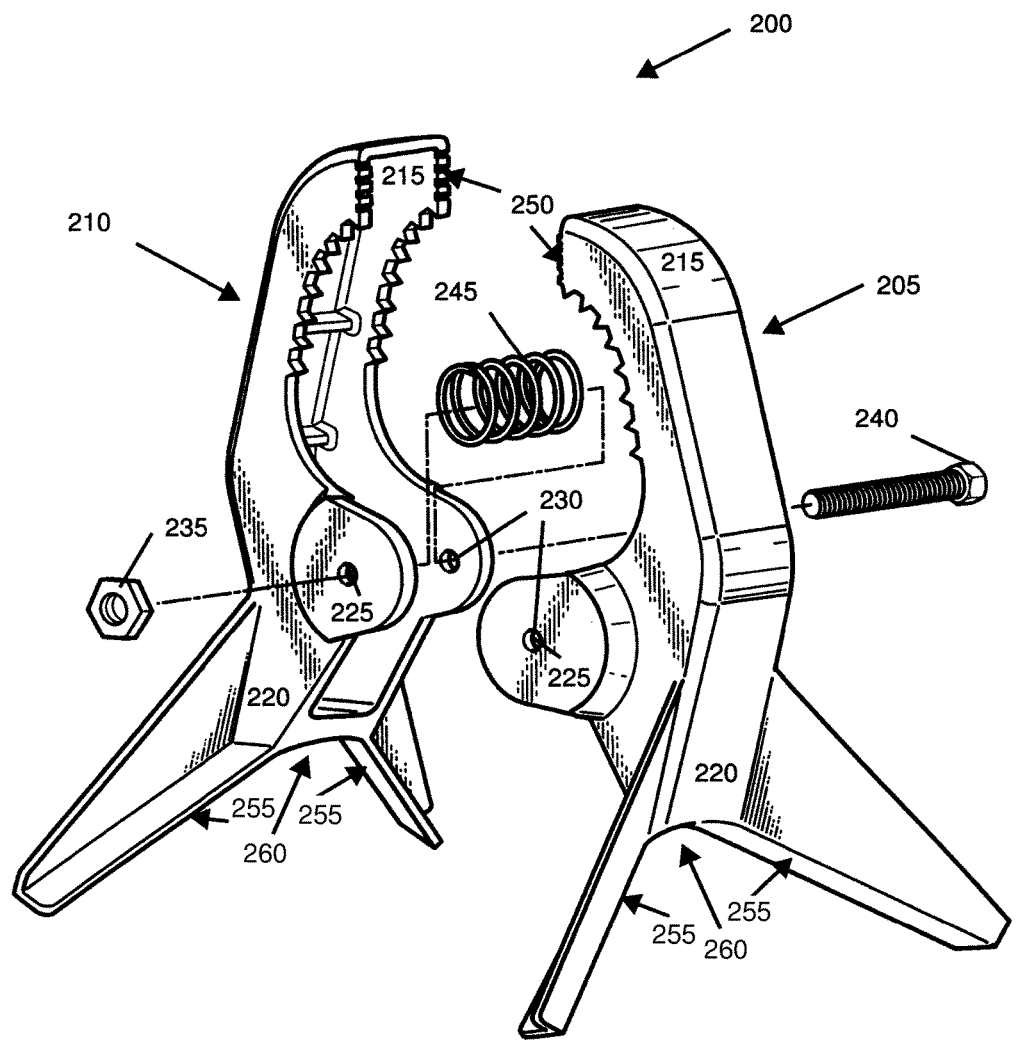
FIG. 2 shows an exploded view of a portable, quick-release shooting stabilization assist clamp.

Referring now to FIG. 2, which provides an exploded view of the portable shooting stabilization assist clamp (200), the clamp (200) comprises a first member (205) and a second member (210). Each member includes a jaw end (215), a rest end (220) and a pivot aperture (225). When assembled, the first member (205) and the second member (210) are aligned and joined at a center fulcrum or pivot point (230) with a nut (235) and bolt (240) through the pivot apertures (225), as shown in FIG. 2. An equivalent securing means such as a rivet or similar mechanisms may also be used. A spring (245) is preferably secured between the pivot points (230) of the first and second members (205, 210). Although a coil spring (245) is shown in FIG. 2, other kinds of springs or spring equivalent, may be used. Springs are preferred for their ease of use, quiet operation, and simplicity. When assembled, the rest ends of the first and second members serve as handles of the portable shooting stabilization assist clamp (200). The user opens the jaws (250) of the clamp (200) by squeezing the rest ends (220) toward each other, thereby overcoming the resistance of the spring (245). Each rest end (220) has a pair of rest extensions (255) that form a cradle (260) for receiving the firearm fore-stock, forend, frame, stock, or barrel of a firearm. The rest extension on each rest end are preferably configured in a V-shape as shown in FIG. 1, but they may also be configured in a U-shape. In addition, the rest end may alternatively include a flat horizontal bar positioned between the two rest extensions to create a wider cradle for the firearm fore-stock, forend, frame, stock, or barrel. The cradle (260) formed with the flat horizontal bar positioned between the rest extensions (255) allows a hunter more freedom to swing the aim of the gun within a limited left-right arc while still providing stability.

Figure 3A:
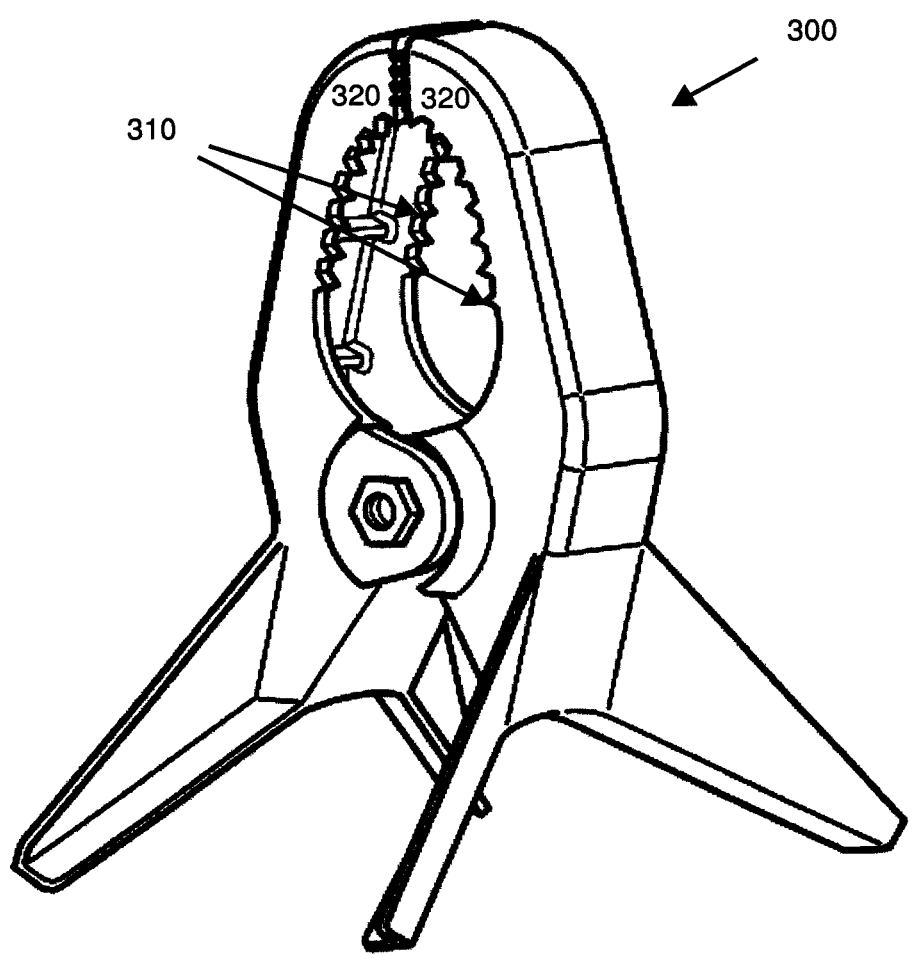
FIG. 3A shows a portable, quick-release shooting stabilization assist clamp.
Figure 3B:
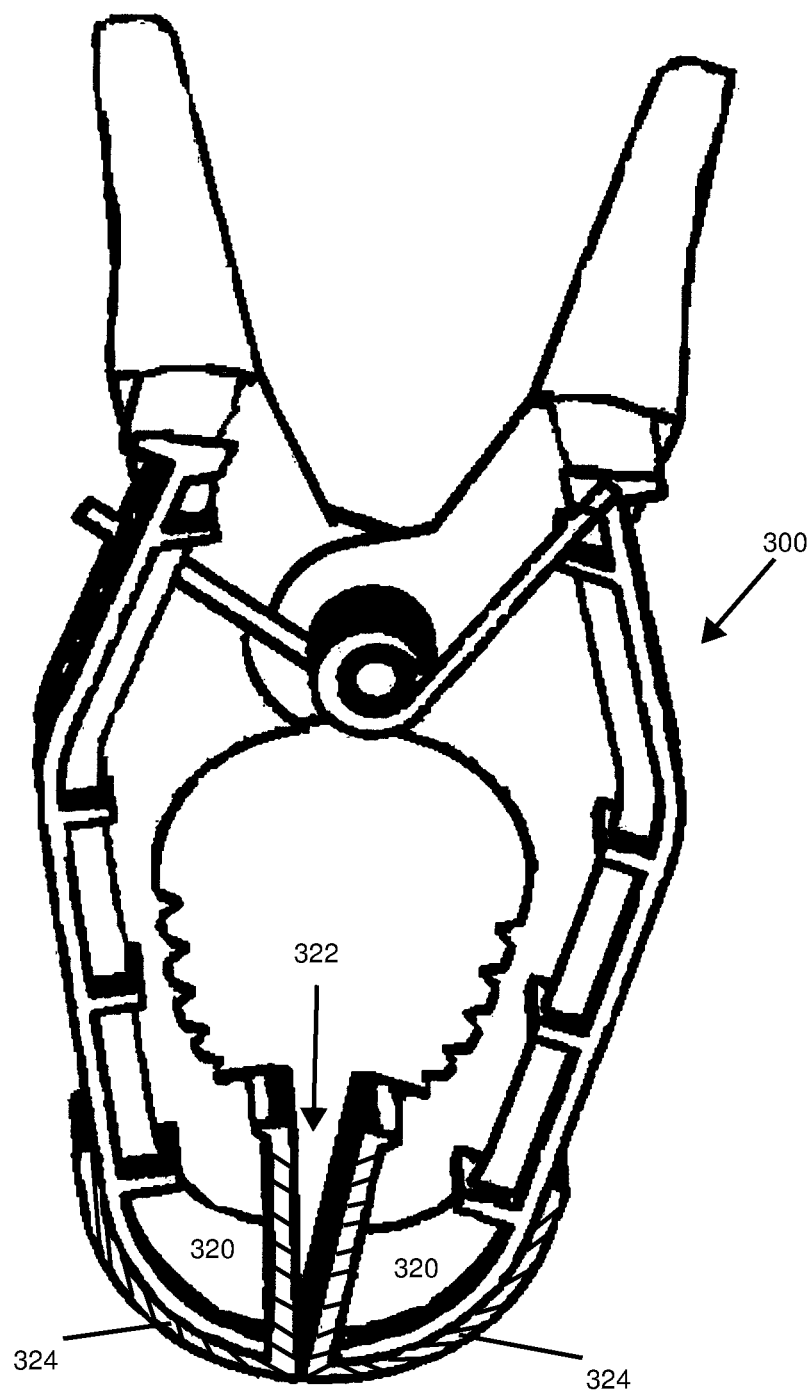
FIG. 3B shows a cross-sectional view of an alternative embodiment of the portable, quick-release shooting stabilization assist clamp that includes a rubber cap attached to each jaw end.
Figure 3C:
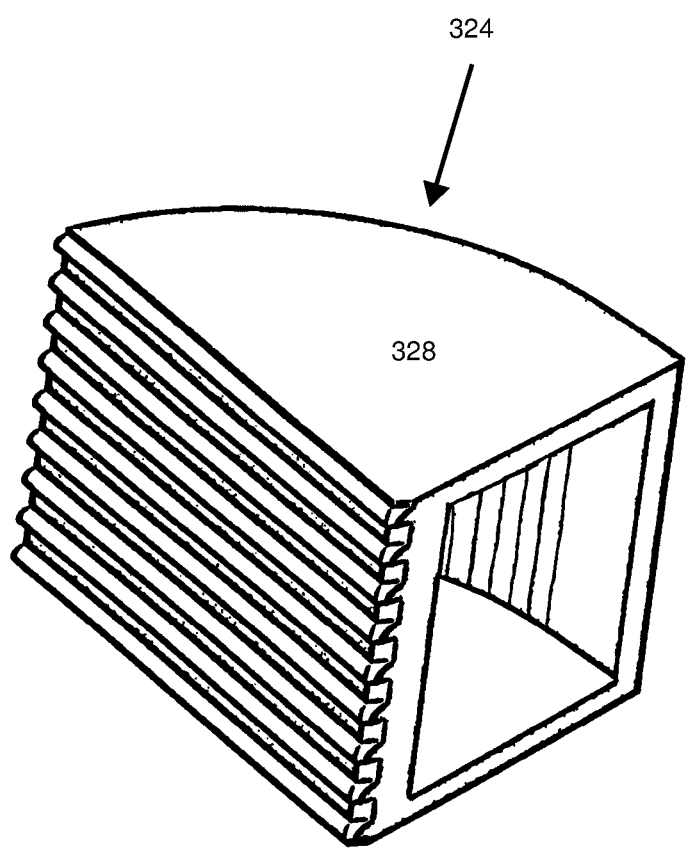
FIG. 3C shows a rubber cap as used in the alternative embodiment, as shown in FIG. 3B.

FIG. 3A provides a view of the preferred embodiment of the portable, quick release shooting stabilization assist clamp (300) as it would appear when fully assembled. Serrations or teeth (310) on the jaws (320) of the clamp (300) serve to increase the gripping ability of the jaws (320) on uneven surfaces and prevent movement when the clamp is in place. Other gripping methods may also be used instead of serrations. For example, rubberized coatings, rubberized tips or other slip resistant materials may be applied to or secured on the jaws to enhance the gripping ability of the jaws (320). Furthermore, pivoting surfaces can also be used to grip on uneven surfaces. In one alternative embodiment as shown in FIG. 3B, a gap (322) is formed between the jaws (320) of the clamp (300). This gap (322) allows a rubber tip (324) to cover the end of each jaw (320). Each rubber tip (324) is either a solid piece of rubber or rubber-like material that is integral to the jaw or a removable piece or cover (328) as shown in FIG. 3C.

Figure 4A:
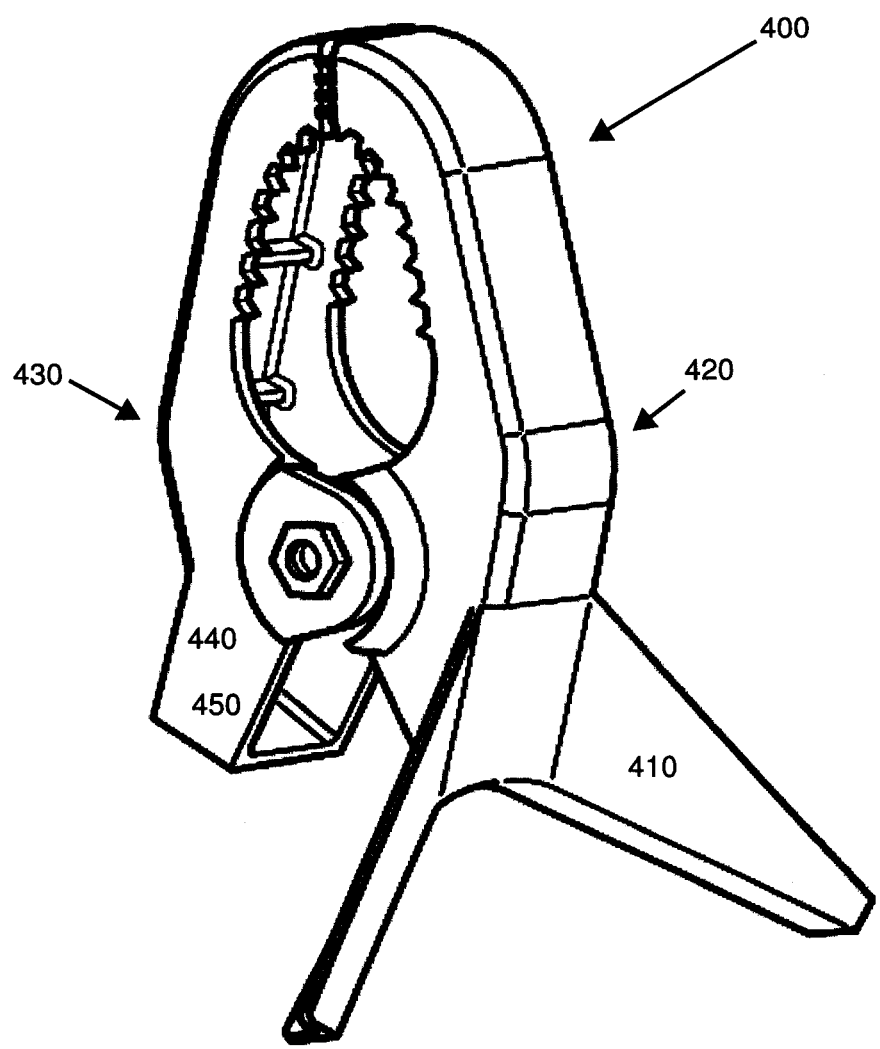
FIG. 4A shows another alternative embodiment of the portable, quick-release shooting stabilization assist clamp.
Figure 4B:
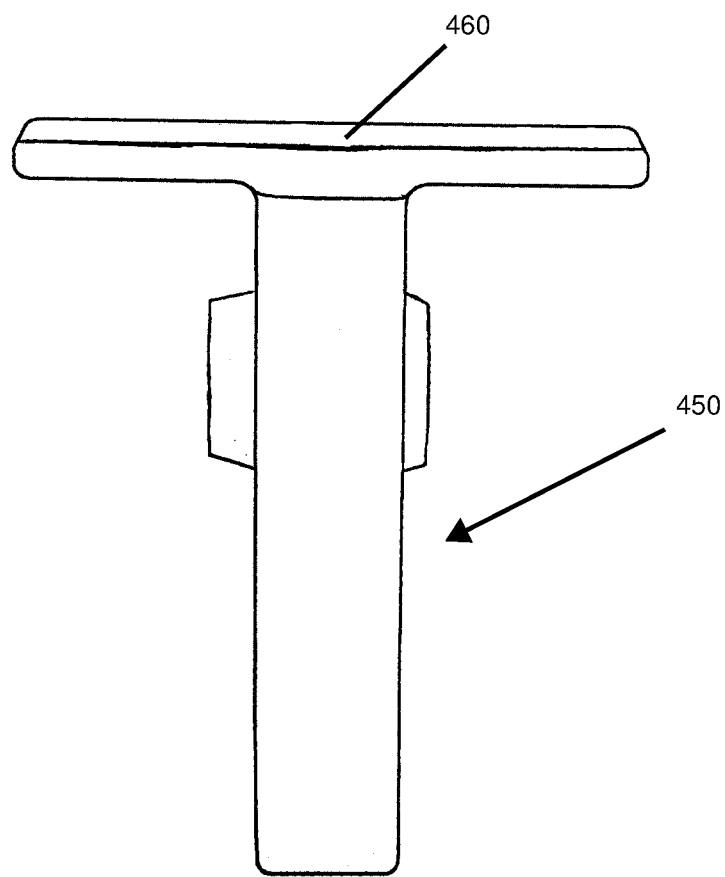
FIG. 4B shows an alternative handle structure for use in the embodiment shown in FIG. 4A.

In an alternative embodiment as shown in FIG. 4A, the portable, quick release shooting stabilization assist clamp (400) provides a rest extension (410) from the first member (420) but not from the second member (430) as in the embodiment previously described in FIGS. 1-3. In this embodiment, the second member (430) includes a rest end (440) that forms a short handle (450) rather than a rest extension. As shown in FIG. 4B, the second member (450) may also provide a flat horizontal bar (460).

Figure 5:
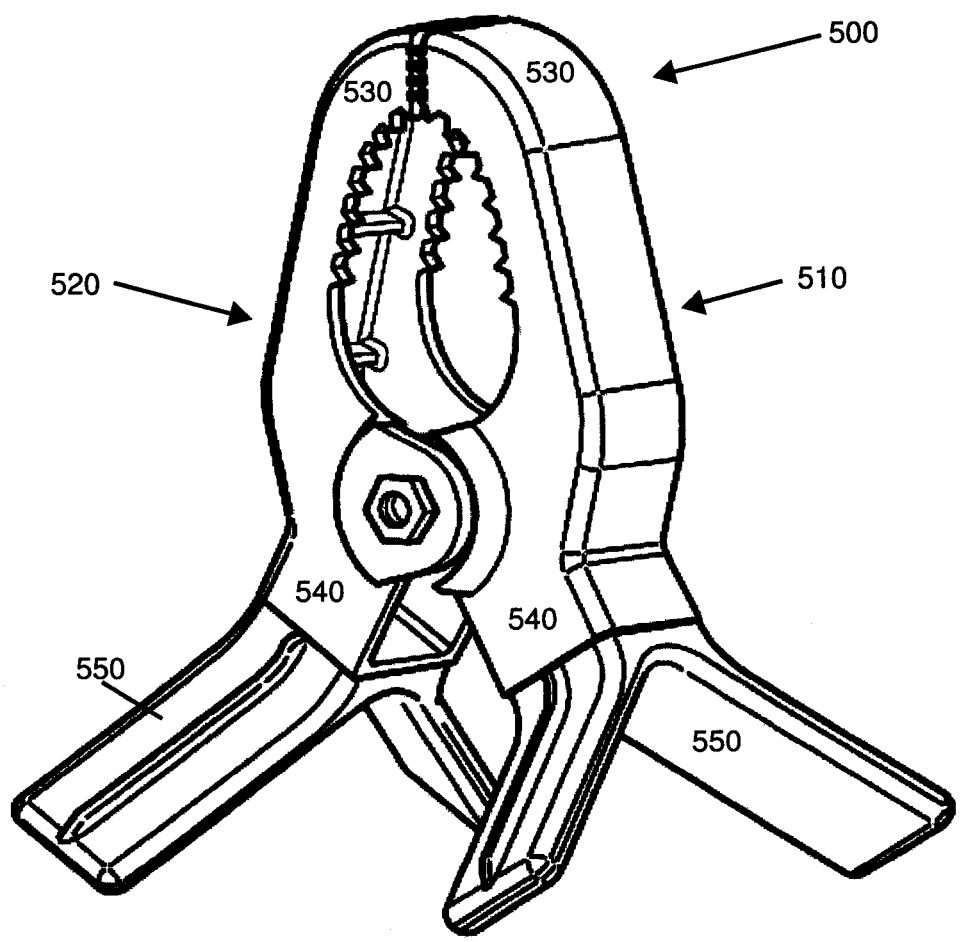
FIG. 5 shows another alternative embodiment of the portable, quick-release shooting stabilization assist clamp. This embodiment allows the rests to pivot in the horizontal plane.
Figure 6:
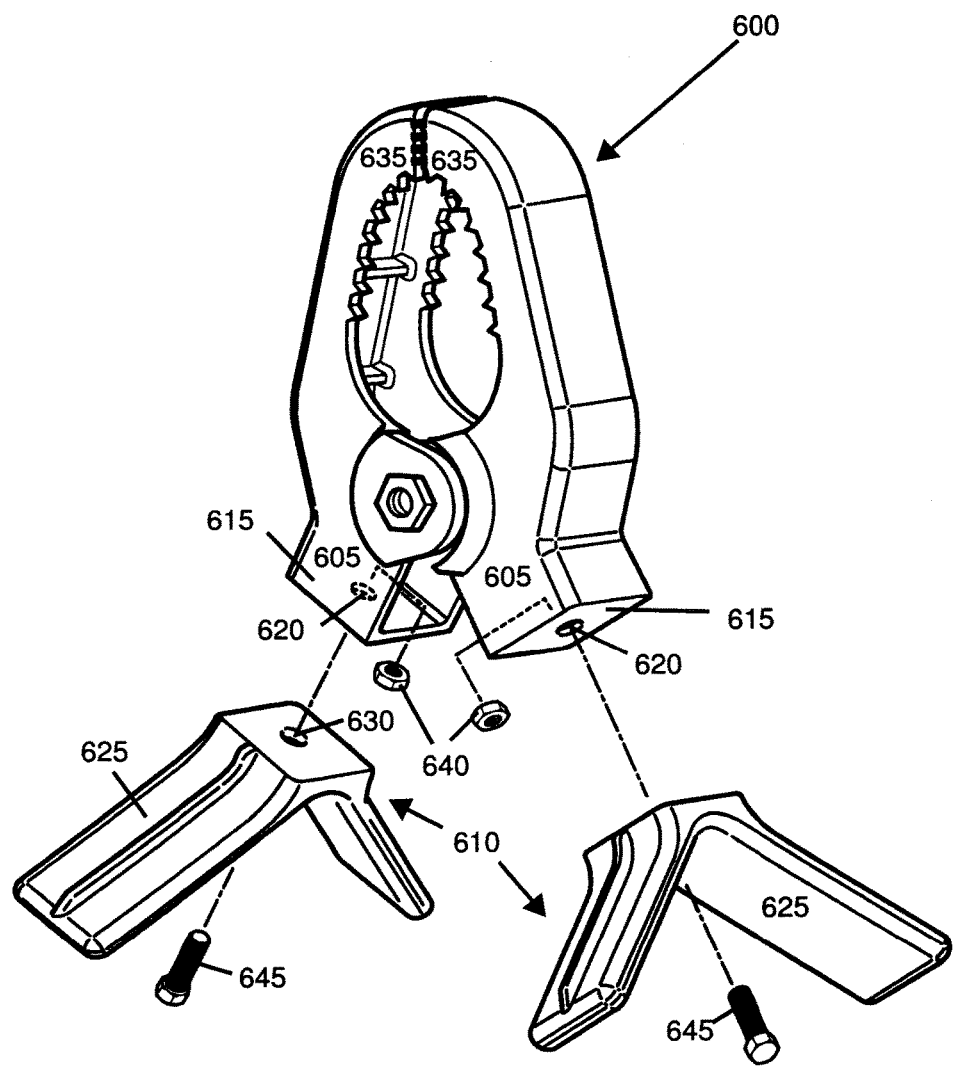
FIG. 6 is an exploded view of the embodiment shown in FIG. 5.

In another alternative embodiment as shown in FIGS. 5 and 6, the portable shooting stabilization assist clamp (500) further includes rotating rest extensions that are able to pivot when in use. As shown in FIG. 5, the clamp comprises a first member (510) and second member (520). Each member includes a jaw end (530), rest end (540) and a rest extension portion (550) that is detachably secured to the rest end (540).

As shown in FIG. 6, this embodiment (600) includes a rest end that extends into a short handle (605) and a jaw end (635). The short handle (605) of each rest end includes a flat base end (615) having an aperture (620). A rest extension portion (610) is detachably secured to a flat base end of each short handle (615) of the rest end by aligning an aperture (620) with the aperture (630) formed in the flat base of the rest extension portion (610). The rest extension projections (625) extend away from the base ends (615) when this embodiment is assembled. This embodiment allows the rest extension portion (610) to swivel while the jaw portion (635) of the member remains in a fixed position. By allowing each rest extension portion to rotate and pivot, a greater range of movement from left to right is allowed while still providing the stability of two contact points on the firearm fore-stock, forend, frame, stock, or barrel. Although the rotating rests are preferably secured with nuts (640) and bolts (645) as shown in FIG. 6, similar securing methods that allow the rests to rotate, may also be used.

Figure 7:
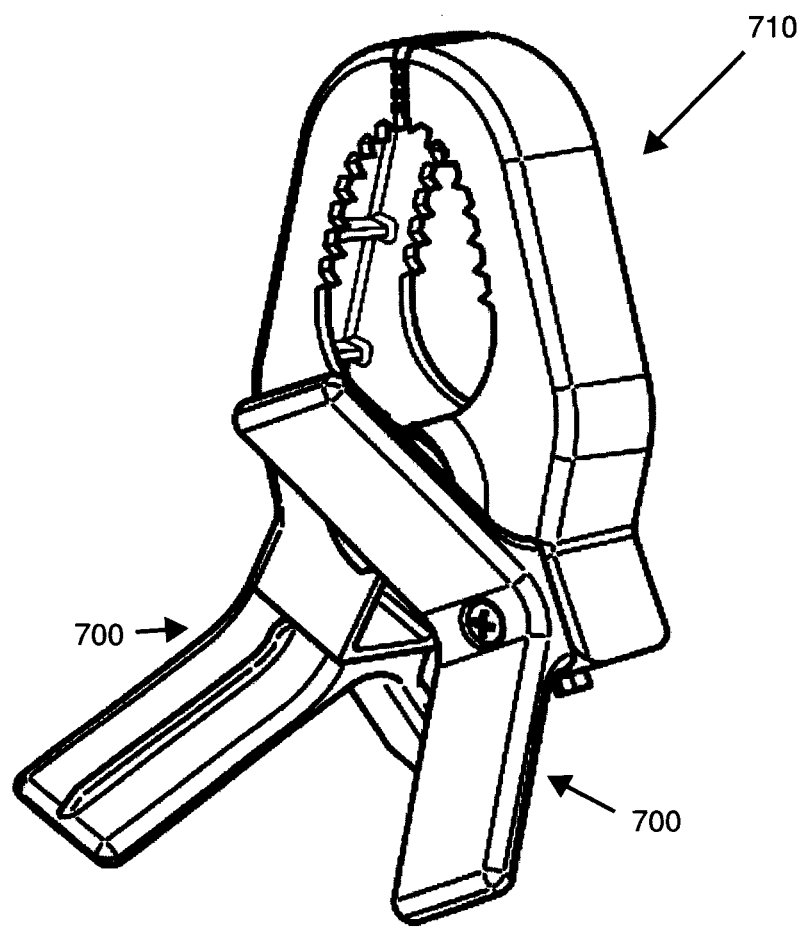
FIG. 7 shows another alternative embodiment of the portable, quick-release shooting stabilization assist clamp. This embodiment allows the rests to pivot and has the rests capable of moving to different planes relative to one another.
Figure 8:
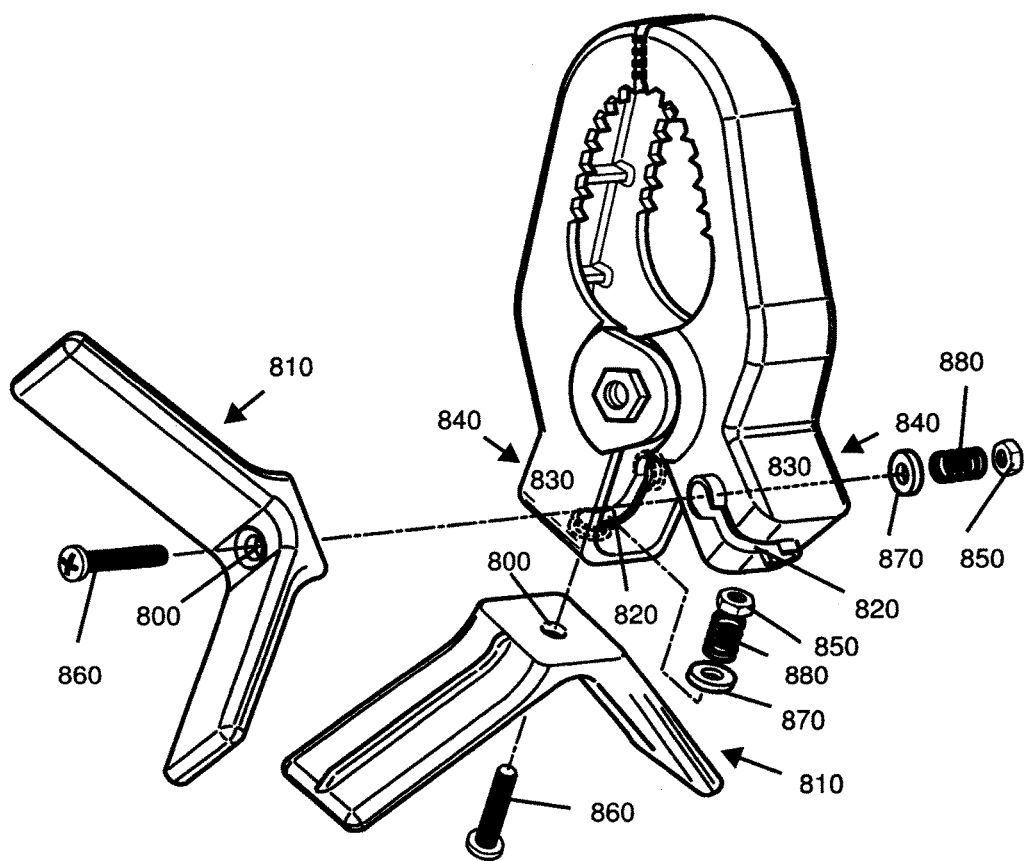
FIG. 8 is an exploded view of the embodiment shown in FIG. 7.

In another alternative embodiment as shown in FIGS. 7 and 8, the rest extensions (700) of the portable shooting stabilization assist clamp (710) are able to rotate, pivot and also move into a different plane of function. As in the embodiment shown in FIG. 5, this embodiment discloses members having detachably secured rest extensions, but provides a slide channel rather than a single fixed aperture in the base of the handle portion at the point in which the rest extension is secured to the member. The slide channel formed within the base of each handle of the rest end extends beyond one plane; thereby, allowing the rest extension portion to slide into a different viewing plane when in use. More specifically, as shown in FIG. 8, each member of this embodiment is assembled by aligning the aperture (800) formed within the base of the rest extension portion (810) with the slide channel (820) formed withing the handle portion (830) of the rest end (840) of the member and securing them together with a nut (850), bolt (860), washer (870), and spring (880) as shown in FIG. 8. This alignment within the slide channel (820) allows the rest extension portion to rotate and slide into different planes of operation as permitted by the slide channel (820). As a result, a shooter has the option to use one or two rest extensions. It enables the use of single rest, by placing one of the rests into a different plane of operation from that of the other rest. It also allows use of the clamp on a vertical pole, tree or similar object.

Figure 9:
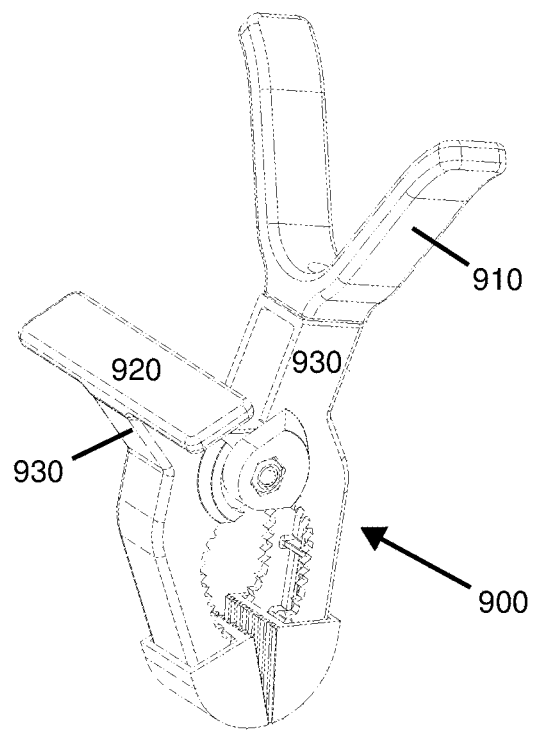
FIG. 9 is another alternative embodiment of the portable, quick-release shooting stabilization assist clamp with a horizontal bar rest extension.

In another alternative embodiment as shown in FIG. 9, the portable shooting stabilization assist clamp (900) includes one cradle rest extension (910) and one horizontal bar rest extension (920). As in the embodiments shown in FIGS. 5 and 6, this embodiment discloses a pair of rest ends (930) having detachably secured rest extensions. Unlike the embodiments show in FIGS. 5 and 6, the rest extensions are dissimilar and include a cradle rest extension (910) and a horizontal bar rest extension (920). The cradle rest extension (910) is V-shaped or U-shaped, as shown in FIGS. 5, 6, 7 and 8. The horizontal bar rest extension (920) is T-shaped. This design provides support and stability to a firearm that has its barrel in the cradle rest extension (910) while not limiting the firearm's transverse pivoting arc while the forend of its barrel is supported on the horizontal bar rest extension (920).

The scope of the invention is not limited to the specific embodiments described herein. Rather, the claim should be looked to in order to judge the full scope of the invention.

We claim:

1. A portable shooting stabilization assist clamp comprising:
   a first member including:
      a jaw end,
      a rest end,
      a horizontal bar rest extension detachably secured to the rest end, and,
      a pivot aperture;
   a second member including:
      a jaw end,
      a rest end,
      a cradle rest extension detachably and pivotably secured to the rest end and,
      a pivot aperture; and,
   a securing device;
   wherein the pivot apertures of the first member and the second member are aligned and secured with the securing device, and wherein the first jaw end and the second jaw end align to form a clamp end, and the horizontal bar rest extension and the cradle rest extension align to form a support end.

2. The clamp of claim 1, wherein the jaw end of the first member and the jaw end of the second member are each coated with a slip resistant coating.

3. The clamp of claim 2, wherein the coating is a rubberized cap.

4. The clamp of claim 1, wherein teeth formed in the jaw end of the first member and the jaw end of the second member are serrated teeth.

5. The clamp of claim 1, further comprising a tension spring aligned and secured between the apertures of the first and second members.

6. The clamp of claim 1, wherein the horizontal bar rest extension is detachably and pivotably secured to the rest end of the first member.

7. A portable shooting stabilization assist clamp comprising:
   a first member including: a jaw end, a rest end, a horizontal bar rest extension detachably secured to the rest end, wherein the horizontal bar rest extension is positioned to support a first portion of a firearm, and a pivot aperture;
   a second member including: a jaw end, a rest end, and a cradle rest extension detachably and pivotably secured to the rest end, wherein the cradle rest extension is positioned to receive and support a second portion of a firearm, and a pivot aperture; and,
   a securing device;
wherein the pivot apertures of the first and second members are aligned and secured with the securing device.

8. The clamp of claim 7, wherein the jaw end of the first member and the jaw end of the second member are coated with a slip resistant coating.

9. The clamp of claim 8, wherein the coating is a rubberized cap.

10. The clamp of claim 7, wherein each jaw of the first member and the second member includes serrated teeth.

11. The clamp of claim 7, wherein the horizontal bar rest extension is detachably and pivotably secured to the rest end of the first member.

* * * * *